United States Patent
Adikan et al.

(10) Patent No.: US 8,218,933 B2
(45) Date of Patent: Jul. 10, 2012

(54) METHOD OF FABRICATING A PLANAR SUBSTRATE HAVING OPTICAL WAVEGUIDES

(75) Inventors: Faisal Rafiq Mahamd Adikan, Taman Sri Delima (MY); Andrew Simon Webb, Southampton (GB); Corin Barry Edmund Gawith, Southampton (GB); Peter George Robin Smith, Romsey (GB); David Neil Payne, Southampton (GB); Jayanta Kumar Sahu, Southampton (GB)

(73) Assignee: University of Southampton, Southampton (GB)

( * ) Notice: Subject to any disclaimer, the term of this patent is extended or adjusted under 35 U.S.C. 154(b) by 391 days.

(21) Appl. No.: 12/311,142

(22) PCT Filed: Sep. 18, 2007

(86) PCT No.: PCT/GB2007/003552
§ 371 (c)(1),
(2), (4) Date: Apr. 15, 2010

(87) PCT Pub. No.: WO2008/035067
PCT Pub. Date: Mar. 27, 2008

(65) Prior Publication Data
US 2010/0284660 A1 Nov. 11, 2010

(30) Foreign Application Priority Data
Sep. 22, 2006 (GB) .................................. 0618771.0

(51) Int. Cl.
*G02B 6/10* (2006.01)
*G02B 6/04* (2006.01)

(52) U.S. Cl. .................. 385/132; 385/120; 385/129

(58) Field of Classification Search .................. None
See application file for complete search history.

(56) References Cited

U.S. PATENT DOCUMENTS
2004/0121247 A1    6/2004  Berkey
(Continued)

FOREIGN PATENT DOCUMENTS
GB             257 590 A      3/1927
(Continued)

OTHER PUBLICATIONS
Webb, A. S. et al., "MCVD planar substrates for UV-written waveguide devices," Electronic Letters, IEE Stevenage, GB, vol. 43, No. 9, Apr. 26, 2007, pp. 517-519.
(Continued)

*Primary Examiner* — Rhonda Peace
(74) *Attorney, Agent, or Firm* — Iandirio Teska & Coleman LLP

(57) ABSTRACT

A method of producing a planar substrate having waveguide channels, which method comprises: (i) providing a tube (6) of a substrate material; (ii) depositing silica layers (110) on the inside of the tube (6), the silica layers (110) being doped with a photosensitive material; (iii) drawing the tube (6) so that the cross-sectional size of the tube (109) is reduced; (iv) before or after the reducing of the cross-sectional size of the tube (6), causing the tube (6) to collapse into a flat shape by applying a low pressure to the tube, whereby the deposited silica layers together form a photosensitive silica layer (111); (v) cutting to required lengths the tube (6) which has been collapsed and reduced in cross-sectional size; and (vi) using laser writing to define waveguide channels in the cut lengths of the tube (6) and thereby to produce the planar substrate having the waveguide channels.

11 Claims, 5 Drawing Sheets

U.S. PATENT DOCUMENTS

2006/0127024 A1 * 6/2006 Smith et al. .................. 385/132
2010/0284660 A1 * 11/2010 Adikan et al. ................ 385/132

FOREIGN PATENT DOCUMENTS

| | | | |
|---|---|---|---|
| GB | 2 369 820 | A | 6/2002 |
| JP | 57 132104 | A | 8/1982 |
| JP | 57 1476074 | A | 9/1982 |
| JP | 62 297233 | A | 12/1987 |
| JP | 63 210044 | A | 8/1988 |
| WO | WO 2008035067 | A1 * | 3/2008 |

OTHER PUBLICATIONS

Emmerson, G. D. et al., "All-UV-written integrated planar Bragg gratings and channel waveguides through single-step direct grating writing," IEE Proceedings: Optoelectronics, Institution of Electrical Engineers, Stevenage, GB, vol. 151, No. 2, Apr. 2004, pp. 119-122.

* cited by examiner

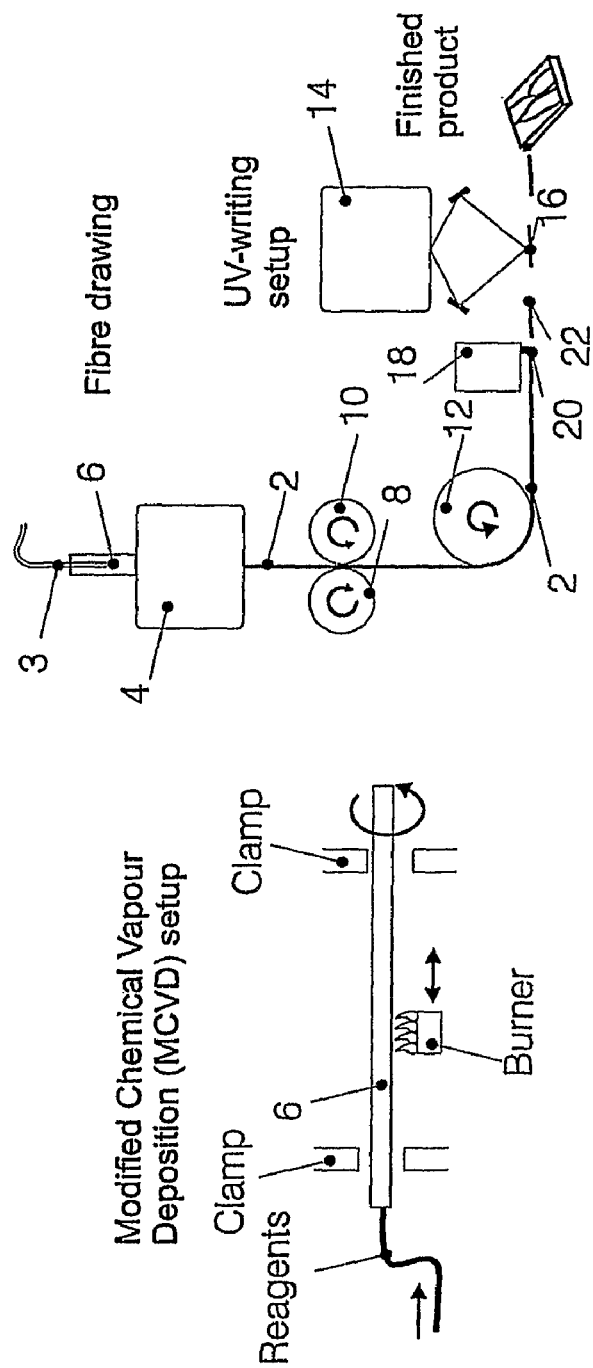
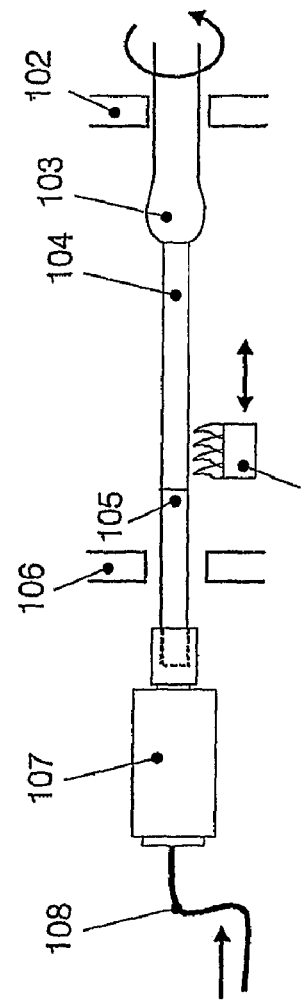
FIG 1
FIG 2

METHOD OF FABRICATING A PLANAR SUBSTRATE HAVING OPTICAL WAVEGUIDES

This invention relates to a method of producing a substantially planar substrate having waveguide channels. The substantially planar substrate may be regarded as being approximately flat or a two-dimensional layer or laminar sheet-like.

GB-A-2369820 discloses a method of producing a planar substrate by blow moulding a circular tube into a facetted mould. Silica layers are deposited on the inside of the tube via modified chemical vapour deposition. Waveguide channels are written into the resultant material through direct ultraviolet writing. For large area doped planar material, the method disclosed in GB-A-2369820 has to compete with techniques such for example as flame hydrolysis deposition and chemical vapour deposition. Also, the material produced according to the method of GB-A-2369820 has to be cut through the deposited glass layers, which may cause cracking if the layers are stressed. Furthermore, the produced planar substrate may be rigid and of a limited size, and not optically flat.

JP-A-57147604 discloses a method of producing plate material by collapsing a cylindrical substrate after depositing silica layers using chemical vapour deposition. The resultant material is cut, and the cut material is polished to remove edges. The produced substrate can then be patterned through photolithography, or polished further to develop waveguides. The cutting and polishing of the substrate to prepare the substrate for the photolithography is a time consuming step. Furthermore, it is difficult to remove overcladding by mechanical polishing to a suitable depth to enable the waveguides to be formed by etching.

PCT WO 2004/049024 discloses a method of producing waveguides and Bragg gratings using ultraviolet irradiation. More specifically, there is disclosed a method of simultaneously defining a waveguide and grating in a sample of photosensitive material. The method comprises providing the sample of photosensitive material having a region which is photosensitive to light of a specific wavelength, generating a spot of light at the specific wavelength, the spot of light having a periodic intensity pattern of high and low intensity fringes, and a width which is related to the channel, positioning the spot of light within the photosensitive region, and causing relative movement between the sample and the spot of light along the desired path of the waveguide/grating and thereby to define a channel of altered refractive index by exposing parts of the photosensitive region to the spot of light.

It is also known to produce optical waveguides and structures via a combination of photolithography and etching. However, it is difficult to accurately etch down a cladding layer approximately 200 μm, whilst minimising under-etch and step coverage problems. In addition, mask alignment of the cross-sectional shape caused by collapsing the optical waveguide is very difficult.

The present invention provides a method of producing a substantially planar substrate having waveguide channels, which method comprises:
 (i) providing a tube of a substrate material;
 (ii) depositing silica layers on the inside of the tube, the silica layers being doped with a photosensitive material;
 (iii) drawing the tube so that the cross-sectional size of the tube is reduced;
 (iv) before or after the reducing of the cross-sectional size of the tube, causing the tube to collapse into a flat shape by applying a low pressure to the tube, whereby the deposited silica layers together form a photosensitive silica layer;
 (v) cutting to required lengths the tube which has been collapsed and reduced in cross-sectional size; and
 (vi) using laser writing to define waveguide channels in the cut lengths of the tube and thereby to produce the planar substrate having the waveguide channels.

The method of the present invention is advantageous in that it can be completed in an inert, un-tampered environment. The formed photosensitive flat silica layer is homogenized by the drawing, thereby relieving any stress in the deposited photosensitive flat silica layer. The tube can be made to be flexible, and thus it can be cut to longer lengths which can be coiled. The material can be of any size within the constraints of fabricating equipment. The material is easily cleaned by hand with a ceramic knife without affecting the photosensitive flat silica layer which forms a core layer.

The silica may be doped at the same time as the silica layers are deposited on the inside of the tube. Alternatively, the silica may be doped after the silica layers are deposited on the inside of the tube.

The silica may be doped with a rare-earth dopant.

The laser may be ultraviolet and/or femtosecond writing.

The method of the invention may include polishing ends of the collapsed tube formed by the cutting.

The present invention also extends to a substantially planar substrate when produced by the method of the invention.

The present invention also extends to a planar waveguide device when having the substantially planar substrate. The planar waveguide device may be, for example, a "1 to N" splitter, an optical add-drop multiplexer, a Bragg grating, a curved waveguide, or a straight channel.

The present invention still further provides a sensor comprising the substantially planar substrate. The sensor may comprise the planar substrate in the form of the Bragg grating.

The present invention also provides a filter when comprising the Bragg grating.

Embodiments of the invention will now be described solely by way of example and with reference to the accompanying drawings in which:

FIG. 1 shows apparatus for carrying out the method of the invention;

FIG. 2-6 shows detailed apparatus for preformed production and collapsing an optical fibre tube;

Figure 3:
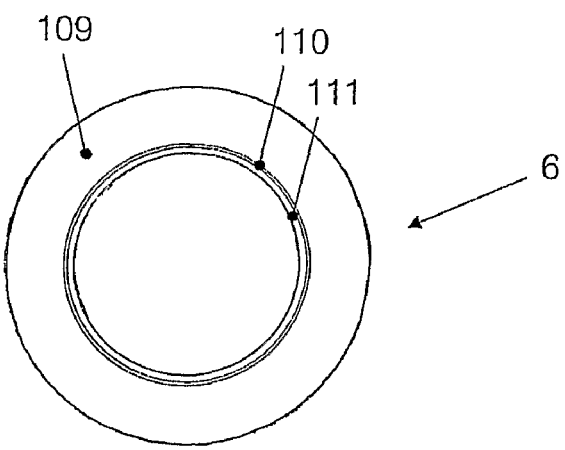

Referring to FIG. 1, a deposition process is used to deposit photosensitive material on the inside of a silica tube. In FIG. 1, there is shown apparatus 2 comprising a furnace 4 having an optical fibre tube 6 which is attached to vacuum. The tube 2 is drawn by counter-rotating rollers 8, 10 as shown. As shown in detail in FIG. 6, the tube 6 is collapsed before it passes around a capstan 12. An ultraviolet writing device 14 writes waveguides on the collapsed tube 2 at position 16. The collapsed tube 2 which has been written on is cut by a cleaver 18 having a blade 20. The cut tube 2 is formed as cut lengths 22.

The optical fibre tube 6 in the furnace 4 forms a tube of substrate material. Silica layers have been deposited on the inside of the tube, the silica layers being doped with a photosensitive material.

The drawing effected by the rollers 8, 10 produces the cross-sectional size of the tube. The collapsing of the tube 6 under vacuum causes the deposited silica layers together to form a photosensitive flat silica layer.

FIG. 2 shows schematically apparatus for producing an initial substrate tube. As shown in FIG. 2, there is a burner 101, a chuck 102, a soot tube 103, a substrate tube 104, a start-up tube 105, a chuck 106, a rotary seal 107, and a delivery line 108.

Figure 4:
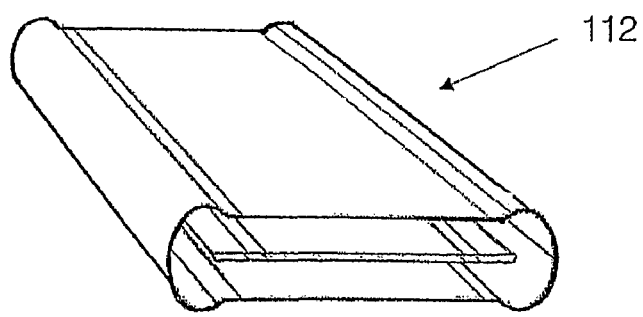
Figure 5:
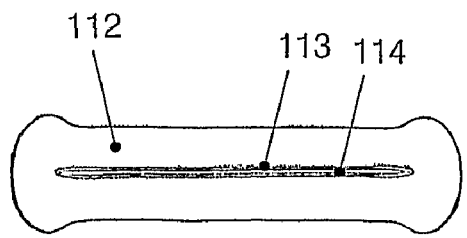

FIG. 3 is a cross-section through an un-collapsed substrate tube 109. As can be seen, the un-collapsed substrate tube 109 comprises a silica cladding layer 110 and a high index core layer 111. FIGS. 4 and 5 show the collapsed tube 109, the collapsed tube 109 being shown as a collapsed substrate tube 112. The collapsed substrate tube 112 is shown having a silica cladding layer 113 and a high index core layer 114.

Figure 6:
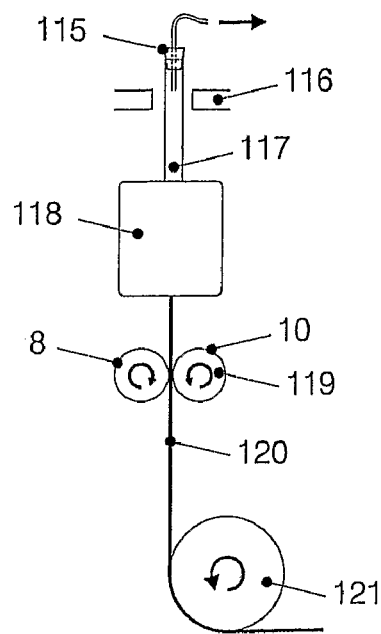

FIG. 6 shows in more detail tube-collapsing and tube-drawing part of the apparatus 2 shown in FIG. 1. In FIG. 6 it will be seen that there is a bung and vacuum line 115, a chuck 116 and a substrate tube 117. A furnace 118 heats the substrate tube 117. A tractor unit 119 comprising the two rollers 8, 10 draws the tube 120 as shown. The tube 120 passes around a capstan 121 which corresponds to the capstan 12 shown in FIG. 1.

Figure 7:
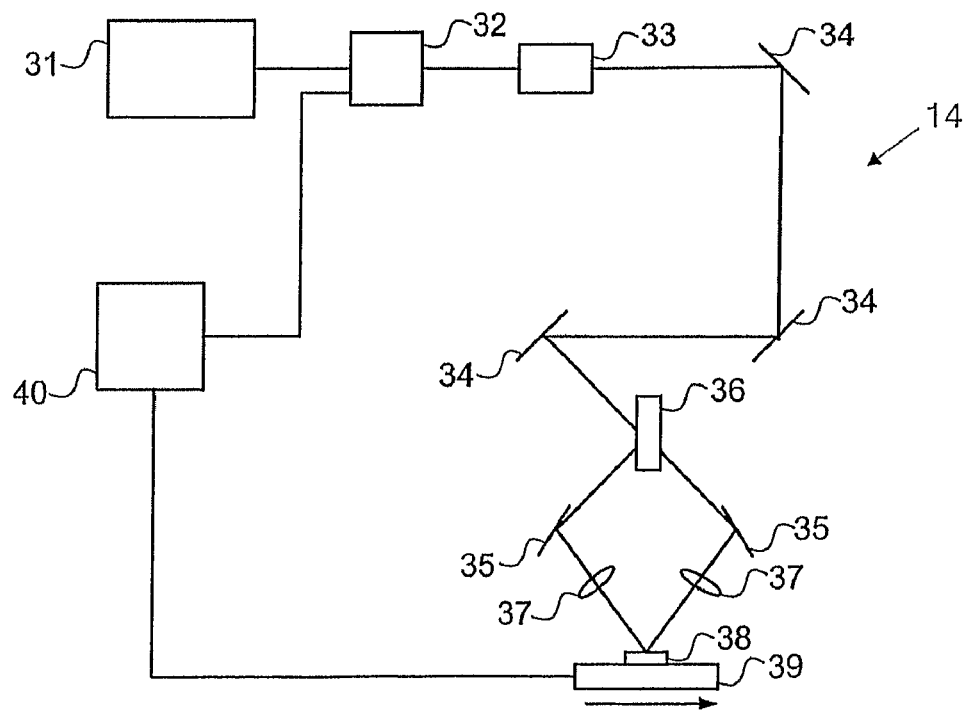
FIG. 7 shows apparatus for direct ultraviolet lighting.

FIG. 7 shows in detail the ultraviolet writing device 14 shown in FIG. 1. More specifically, FIG. 7 shows an ultraviolet laser 131. The laser 131 may be a 244 nm frequency doubled argon-ion laser.

The ultraviolet writing device 14 includes an acousto-optic modulator 132, a spatial filter 133, and mirrors 134. Light from the mirrors 134 is split as shown by a beam splitter 136. Independently moveable mirrors 135 direct the light as shown to focusing lenses 137, and then onto a photosensitive sample 138. The writing is on an air-bearing stage 139. The apparatus operates under the control of a control unit 140. The control unit 140 is a computer control unit 140.

Typical ultraviolet light writing parameters which are given by way of example only may be as follows:
(i) Typical writing fluence of 15 kJcm$^{-2}$ (laser power ~50 mW continuous)
(ii) Typical Bragg gratings duty cycle of 50% and gratings length of 1.5 mm.
(iii) UV beam spot ~5 μm.
(iv) Hydrogen loading at 120 bar. The hydrogen loading may be conducted for any suitable and appropriate time, for example 1 week. In some cases, the hydrogen loading may not be required.

The preferred ultraviolet writing parameters are as follows:
(a) Uniform and flat core layer along propagation axis and laterally (flatness variation of <1 μm).
(b) Single-mode core layer for standard applications such as power routing. Multi-mode core layer is also useful in sensing applications.
(c) High photosensitivity level.
(d) High rare-earth doping levels for active device fabrication.
(e) A workable lateral/width of at least 1 mm
(f) Overclad thickness of 50 μm.

Figure 8:
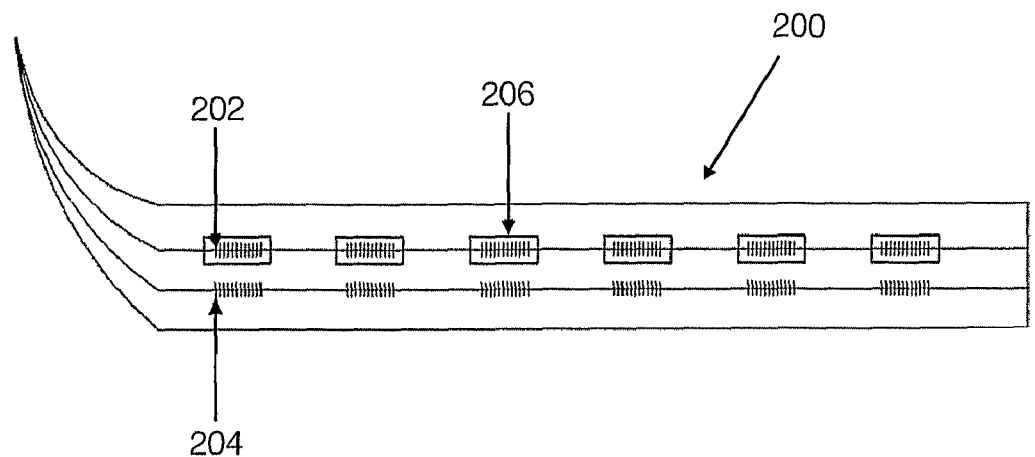
FIG. 8 shows a distributed planar sensor.

FIG. 8 shows a distributed planar sensor 200. The distributed planar sensor 200 comprises sensor gratings 202, reference gratings 204 and etched windows 206.

Figure 9:
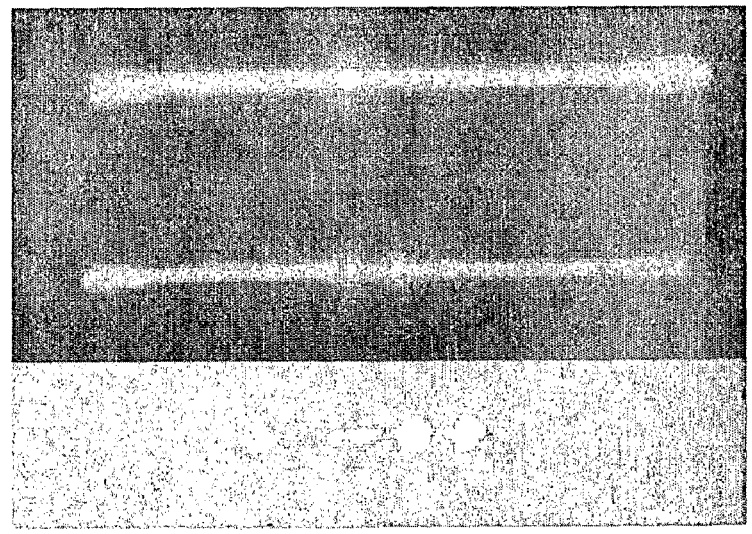
FIG. 9 shows modes of ultraviolet written straight channel and Y-splitters formed in silica planar material.

FIG. 9 shows modes of ultraviolet written straight channel and Y-splitters.

Figure 10:
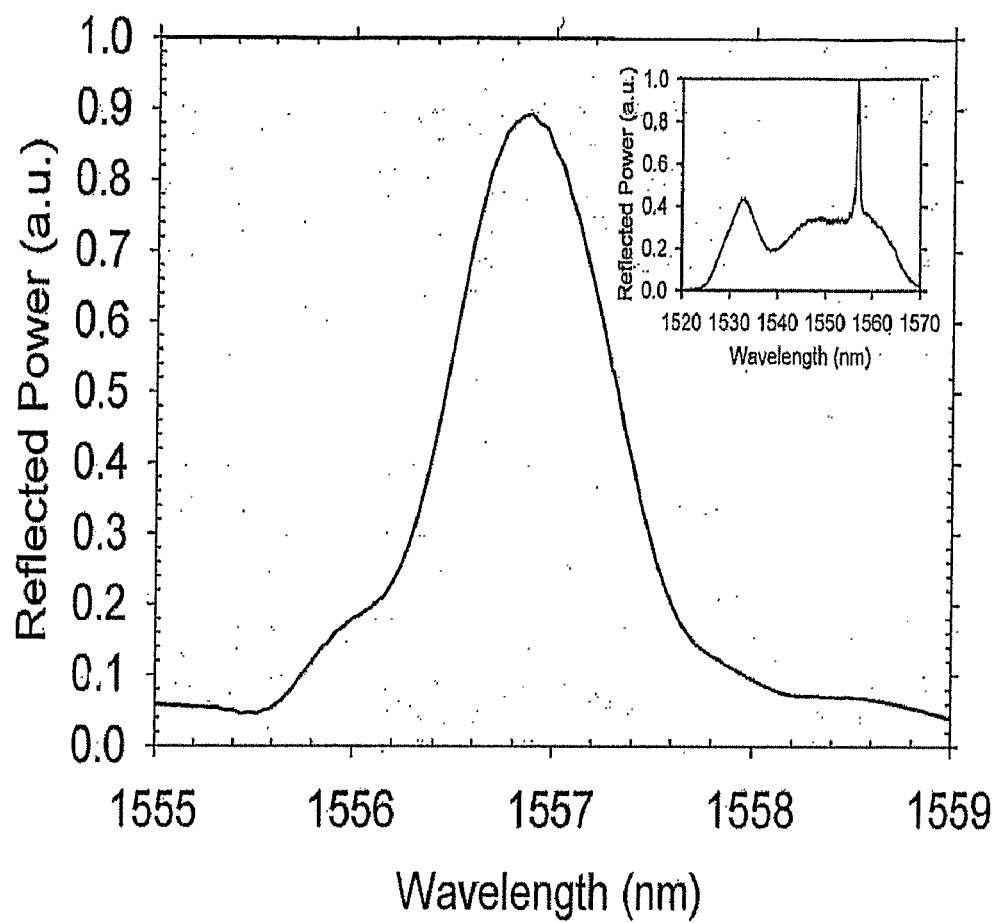
FIG. 10 shows Bragg gratings reflection spectra.

The method of the present invention was used to produce Bragg gratings having reflection spectra as set out in FIG. 10. It will be seen that inset into FIG. 10 is ASE spectra of the input light and the Bragg gratings' reflection.

The method of the present invention may be especially useful in the following commercial areas:

I. Planar Sample Fabrication Market
(a) Low cost high purity planar sample fabrication
(b) Extended length planar samples (>15 cm (6 inches))
(c) High doping potential—high photosensitivity, active devices (rare-earth doping).
(d) Flexible planar samples.

II. Direct UV Written Devices Market
(a) Planar waveguide devices including:
    (i) Optical power splitters/couplers
    (ii) Optical add-drop multiplexers
    (iii) Switching arrays.
(b) Gratings based devices including:
    (i) Point and distributed sensors (strain, chemical).
    (ii) Narrowband filters.
    (iii) Lab on chip applications.
    (iv) Microfluidic-based applications.
(c) Optically active devices including:
    (i) Rare earth doped lasers.
    (ii) Rare earth doped amplifiers.

It is to be appreciated that the embodiments of the invention described above with reference to the accompanying drawings have been given by way of example only and that modifications may be effected. Thus, for example, the apparatus shown in FIGS. 2 and 6 may be varied to suite commercial production.

The invention claimed is:

1. A method of producing a substantially planar substrate having waveguide channels, which method comprises:
   (i) providing a tube of a substrate material;
   (ii) depositing silica layers on the inside of a tube, the silica layers being doped with a photosensitive material;
   (iii) drawing the tube so that the cross-sectional size of the tube is reduced;
   (iv) before or after the reducing of the cross-sectional size of the tube, causing the tube to collapse into a flat shape by applying a low pressure to the tube, whereby the deposited silica layers together form a photosensitive silica layer;
   (v) cutting to required lengths the tube which has been collapsed and reduced in cross-sectional size; and
   (vi) using laser writing to define waveguide channels in the cut lengths of the tube and thereby to produce the planar substrate having the waveguide channels.

2. A method according to claim 1 in which the silica is doped at the same time as the silica layers are deposited on the inside of the tube.

3. A method according to claim 1 in which the silica is doped after the silica layers are deposited on the inside of the tube.

4. A method according to claim 1 in which the silica is doped with a rare-earth dopant.

5. A method according to claim 1 in which the laser writing is ultraviolet and/or femtosecond writing.

6. A method according to claim 1 and including polishing ends of the collapsed tube formed by the cutting.

7. A substantially planar substrate when produced by a method according to claim 1.

8. A planar waveguide device when having a substantially planar substrate according to claim 7.

9. A planar waveguide device according to claim 8 and in the form of a "1 to N" splitter, and optical add-drop multiplexer, a Bragg grating, a curved waveguide, or a straight channel.

10. A filter when comprising a Bragg grating according to claim 9.

11. A sensor when comprising a substantially planar substrate according to claim 7.

* * * * *